(12) United States Patent
Li et al.

(10) Patent No.: US 10,749,635 B2
(45) Date of Patent: Aug. 18, 2020

(54) RANDOM-ACCESS AND SCHEDULING-REQUEST IN NEW RADIO-THINGS SIDELINK

(71) Applicant: Apple Inc., Cupertino, CA (US)

(72) Inventors: Qian Li, Beaverton, OR (US); Guangjie Li, Beijing (CN); Geng Wu, Portland, OR (US); Xiaoyun May Wu, Portland, OR (US); Joonbeom Kim, Carrollton, TX (US); Hassan Ghozlan, Hillsboro, OR (US); Dawei Ying, Hillsboro, OR (US); Vesh Raj Sharma Banjade, Hillsboro, OR (US); Satish Chandra Jha, Hillsboro, OR (US); Yaser M. Fouad, Hillsboro, OR (US); Lu Lu, Hillsboro, OR (US)

(73) Assignee: Apple Inc., Cupertino, CA (US)

( * ) Notice: Subject to any disclaimer, the term of this patent is extended or adjusted under 35 U.S.C. 154(b) by 11 days.

(21) Appl. No.: 16/079,617

(22) PCT Filed: Oct. 31, 2016

(86) PCT No.: PCT/US2016/059704
§ 371 (c)(1),
(2) Date: Aug. 24, 2018

(87) PCT Pub. No.: WO2017/146784
PCT Pub. Date: Aug. 31, 2017

(65) Prior Publication Data
US 2019/0058551 A1   Feb. 21, 2019

Related U.S. Application Data

(60) Provisional application No. 62/300,332, filed on Feb. 26, 2016, provisional application No. 62/329,047, (Continued)

(51) Int. Cl.
*H04L 1/16* (2006.01)
*H04W 72/04* (2009.01)
*H04W 74/08* (2009.01)

(52) U.S. Cl.
CPC ......... *H04L 1/1657* (2013.01); *H04W 72/042* (2013.01); *H04W 72/0446* (2013.01); *H04W 74/0833* (2013.01); *H04W 74/0866* (2013.01)

(58) Field of Classification Search
CPC ............. H04L 1/1657; H04W 72/042; H04W 72/0446; H04W 74/0866; H04W 74/0833
See application file for complete search history.

(56) References Cited

U.S. PATENT DOCUMENTS

2014/0127991 A1   5/2014   Lim et al.
2014/0206322 A1*  7/2014   Dimou ................. H04W 76/14
                                                455/414.1
(Continued)

FOREIGN PATENT DOCUMENTS

WO   WO-2014014323 A1   1/2014
WO   WO-2017146784 A1   8/2017

OTHER PUBLICATIONS

"International Application Serial No. PCT/US2016/059704, International Search Report dated Feb. 6, 2017", 3 pgs.
(Continued)

*Primary Examiner* — Jianye Wu
(74) *Attorney, Agent, or Firm* — Kowert, Hood, Munyon, Rankin & Goetzel, P.C.

(57) ABSTRACT

Embodiments of a system and method for random access and scheduling request for new radio things sidelink are generally described herein. In some embodiments, a nUE (network user equipment) schedules a RA (random access) resource in a control channel. The nUE decodes a TAS (transmitter resource acquisition and sounding) payload, received from a wUE (wearable user equipment) in a PRB
(Continued)

(physical resource block) addressed to a RA-ID (random access identifier) associated with the nUE. The nUE encodes, in response to decoding the TAS payload, a RAS (receiver resource acknowledgement and sounding) payload in the PRB. The nUE decodes initial access content received via a data channel from the wUE, the initial access content including a pro posed temp ID (temporary identifier) for addressing the wUE. The nUE encode, in response to the initial access content, an ACK (acknowledgement), addressed to the wUE, to accept initial access of the wUE.

20 Claims, 10 Drawing Sheets

Related U.S. Application Data filed on Apr. 28, 2016, provisional application No. 62/405,039, filed on Oct. 6, 2016.

(56) References Cited

U.S. PATENT DOCUMENTS

| | | |
|---|---|---|
| 2015/0029866 A1* | 1/2015 | Liao ...................... H04W 4/023 370/241 |
| 2016/0044724 A1 | 2/2016 | Seo et al. |
| 2019/0052442 A1* | 2/2019 | Kim ...................... H04L 5/0057 |

OTHER PUBLICATIONS

"International Application Serial No. PCT/US2016/059704, Written Opinion dated Feb. 6, 2017", 11 pgs.

* cited by examiner

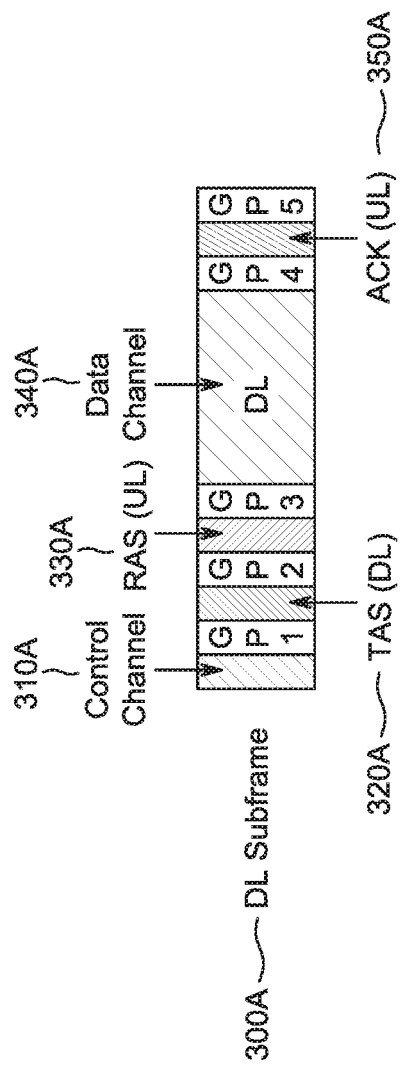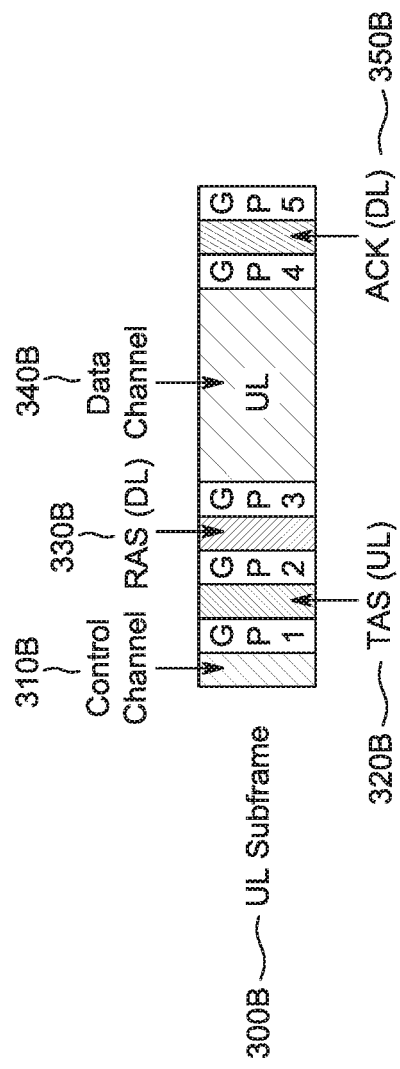

RANDOM-ACCESS AND SCHEDULING-REQUEST IN NEW RADIO-THINGS SIDELINK

PRIORITY CLAIM

This application is a U.S. National Stage Application under 35 U.S. C. 371 from International Application No. PCT/US2016/059704, filed Oct. 31, 2016, which claims priority under 35 U.S.C. § 119 to U.S. Provisional Patent Application Ser. No. 62/300,332, filed Feb. 26, 2016, and titled, "5G LTE Wearables Physical Layer Communication Protocol," which is incorporated herein by reference in its entirety. PCT/US2016/059704 also claims priority under 35 U.S.C. § 119 to U.S. Provisional Patent Application Ser. Nos. 62/329,047, filed Apr. 28, 2016, and 62/405,039, filed Oct. 6, 2016, each of which are incorporated herein by reference in their entirety.

TECHNICAL FIELD

Embodiments pertain to wireless communications. Some embodiments relate to random access and scheduling request procedures in fifth generation (5G) new radio (NR) things sidelink.

BACKGROUND

Wearable user equipment (wUEs), such as fitness trackers, smart watches, smart glasses, etc., are becoming more and more popular. A wUE may communicate with a network user equipment (nUE) or directly with a network. Techniques for allowing a wUE to discover and connect with a nUE may be useful. Thus, there are general needs for systems and methods for random access and scheduling request procedures in fifth generation (5G) new radio (NR) things sidelink.

BRIEF DESCRIPTION OF THE DRAWINGS

FIG. 3A is a block diagram illustrating an example downlink subframe structure per physical resource block, in accordance with some embodiments.

FIG. 3B is a block diagram illustrating an example uplink subframe structure per physical resource block, in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
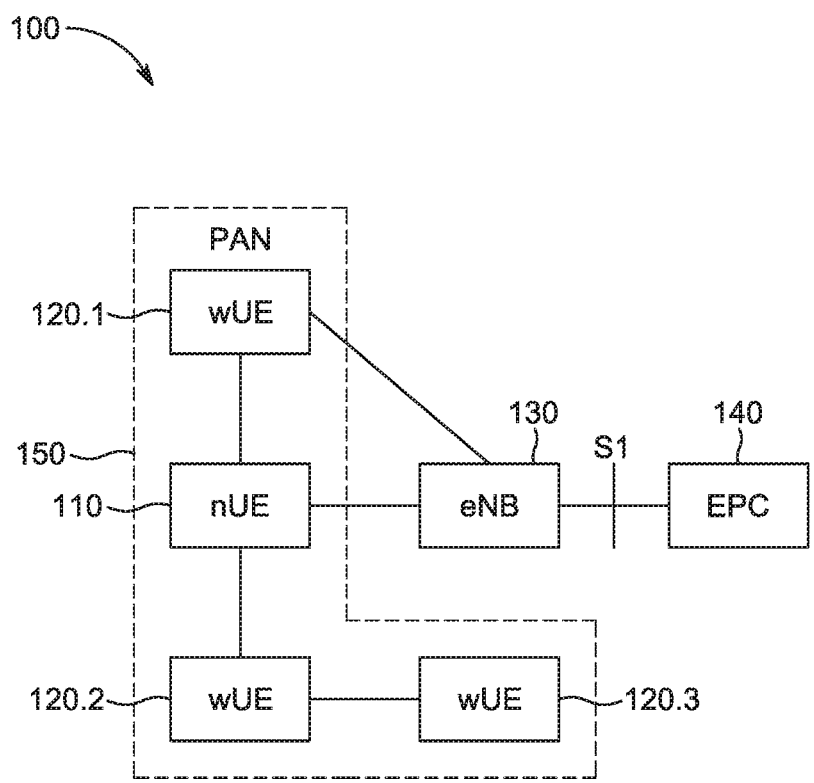
FIG. 1 is a block diagram of an example system architecture for supporting wearable user equipment, in accordance with some embodiments.

FIG. 1 is a block diagram of a system architecture 100 for supporting wearable user equipment. As shown, the system architecture 100 includes a network user equipment (nUE) 110, wearable user equipments (wUEs) 120.1-3, an evolved NodeB (eNB) 130, and an evolved packet core (EPC) 140. The nUE 110 and the wUEs 120 together form a personal area network (PAN) 150.

The nUE 110 is any user equipment capable of communicating with the eNB 130 via an air interface. According to some examples, the nUE 110 is a mobile phone, a tablet computer, a smart watch, etc. According to some examples, the nUE may be a wUE that is capable of communicating with the eNB 130. The nUE 110 has a full infrastructure network access protocol and full control and user plane (C/U-plane) functions.

Each wUE 120.1-3 includes a wireless interface for communicating within the PAN 150. The wUEs 120.1-3 include, in some cases, smart watches, smart glasses, smart headphones, fitness sensors, movement trackers, sleep sensors, etc. Some wUEs 120.1 and 120.2 communicate with the nUE 110. Some wUEs 120.2 and 120.3 communicate with one another. Some wUEs 120.1 communicate directly with the eNB 130. The eNB 130 communicates with the EPC 140 using a S interface.

Some aspects of the subject technology are directed to the random access (RA) and scheduling request (SR) procedure in fifth generation (5G) new radio (NR) things sidelink. According to some examples, RA and SR resources are dynamically scheduled by the control channel. RA and SR procedures are embedded in the data transmission procedure.

Figure 2:
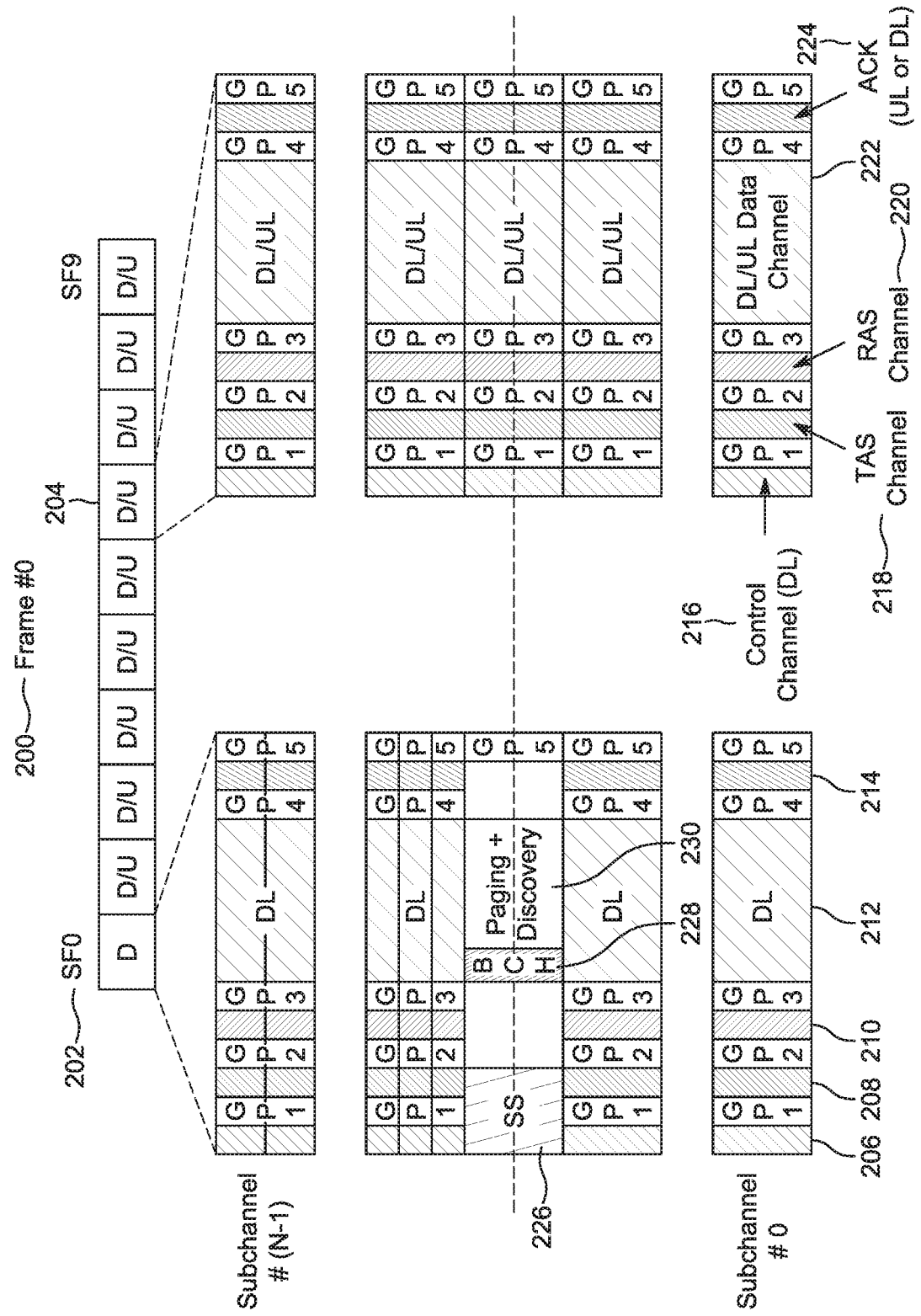
FIG. 2 is a block diagram illustrating an example frame structure, in accordance with some embodiments.

FIG. 2 is a block diagram illustrating an example frame structure for a frame 200, in accordance with some embodiments. The frame 200 includes a first subframe 202 and other subframes, including the subframe 204. The frame 200 includes ten subframes total, including the subframes 202 and 204. The first subframe 202 is a downlink (DL) subframe, where the synchronization signals (SS) 226, system information broadcasting in broadcast channel (BCH) 228, and paging and discovery signal 230 are transmitted with user data. The other nine subframes, including the subframe 204, can be either DL or uplink (UL). Each sidelink cell (e.g., nUE 110 or wUE 120) independently configures the DL/UL subframes based on its own traffic and needs.

As shown, each subframe 202/204 includes a control channel 206/216, transmitted in the DL, a TAS (transmitter resource acquisition and sounding) channel 208/218, transmitted by the transmitter, a RAS (receiver resource acknowledge and sounding) channel 210/220, transmitted by the receiver, a data channel 212/222, transmitted by the transmitter, and an acknowledgement (ACK) channel 214/224, transmitted by the receiver. Guard periods (GPs) follow each of these channels.

According to some embodiments, each frame 200 has 10 subframes (including the subframes 202 and 204). Each subframe includes $N_{symbol}$ symbols, where $N_{symbol}$ is a fixed positive integer. The subframe length may vary depending on the subcarrier spacing and the corresponding symbol length. For example, the subframe lengths may be 0.5 ms, 1 ms, 2 ms, etc. Each subframe is divided into multiple physical resource blocks (PRBs) in the frequency domain. Each PRB occupies $N_{PRBsubcarrier}$ subcarriers over one subframe. For instance, for a subcarrier spacing of 60 kHz, a subframe duration of 1 ms and a system bandwidth of 20 MHz, each PRB occupies three subcarriers. The PRBs are grouped into subchannels. Each subchannel occupies six PRBs. The basic resource allocation unit is a PRB. In some cases, the minimum system bandwidth is the size of one subchannel. Some radio resource assignment notations used in this document are indicated in Table 1.

TABLE 1

Radio resource assignment notations

| Radio resource notations | Definitions |
|---|---|
| Resource element (RE) | 1 subcarrier over one symbol |
| Resource unit (RU) | 3 subcarriers over 4 consecutive symbols (in total 12 REs) |
| Physical resource block (PRB) | 3 subcarriers over one subframe |
| Physical resource assignment (PRA) | The resource allocation unit. Can be an aggregation of multiple continuous PRBs |
| Subchannel | 6 PRBs consecutive in frequency domain |

Figure 4:
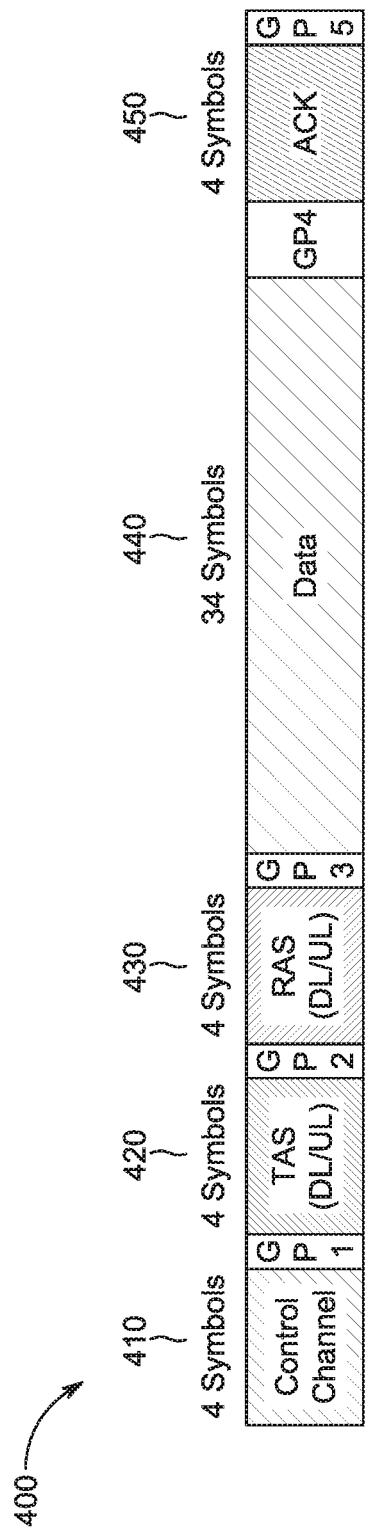
FIG. 4 is a block diagram illustrating an example symbol allocation among channels in one physical resource block, in accordance with some embodiments.
Figure 5:
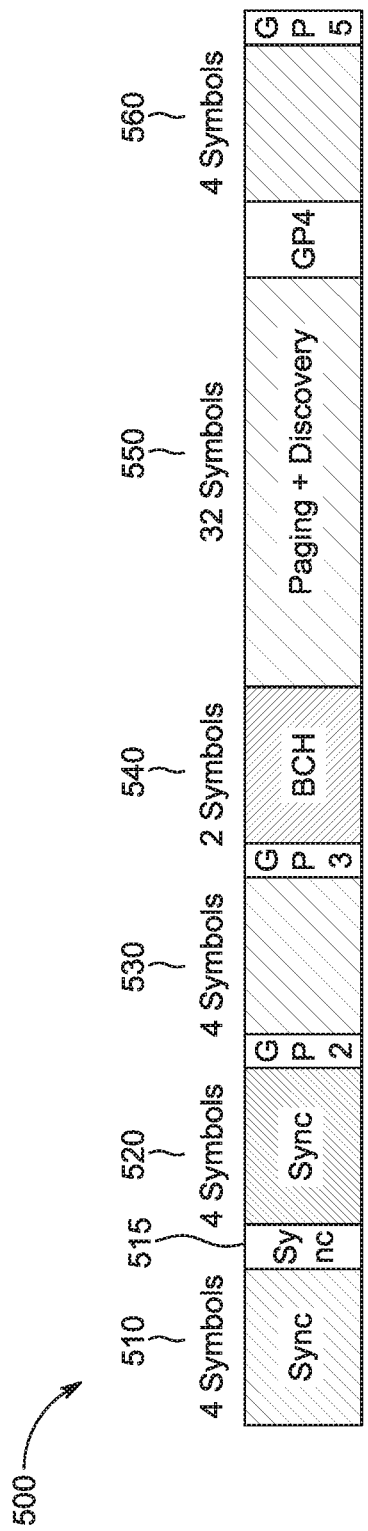
FIG. 5 is a block diagram illustrating an example subframe structure in the central six physical resource blocks of the first subframe in each frame, in accordance with some embodiments.

The physical control and data channels are localized within one PRA. In the NR-things sidelink, one PRA takes one PRB. FIGS. 3A-3B show the DL and UL subframe structure per PRB. FIG. 4 shows the radio resource allocation among symbols in one PRB. FIG. 5 shows the subframe structure in the central 6 PRB of the first subframe in each frame.

FIG. 3A is a block diagram illustrating an example DL subframe 300A structure per physical resource block. As shown, the DL subframe 300A includes a control channel 310A, a TAS (DL) channel 320A, a RAS (UL) channel 330A, a data channel 340A (e.g., physical uplink shared channel (PUSCH) or physical downlink shared channel (PDSCH)), and an ACK (UL) channel 350A. GPs follow each of these channels.

FIG. 3B is a block diagram illustrating an example UL subframe 300B structure per physical resource block. As shown, the UL subframe 300B includes a control channel 310B, a TAS (UL) channel 320B, a RAS (DL) channel 330B, a data channel 340B (e.g., PUSCH or PDSCH), and an ACK (DL) channel 350A. GPs follow each of these channels.

FIG. 4 is a block diagram illustrating an example symbol allocation among channels in one PRB 400. The PRB 400 occupies three subcarriers. One subframe includes 56 symbols. As shown, the PRB 400 includes, in order: a control channel 410, guard period 1 (GP1), a TAS (DL/UL) 420, guard period 2 (GP2), a RAS (DL/UL) 430, guard period 3 (GP3), data 440, guard period 4 (GP4), an ACK 450, and guard period 5 (GP5). The control channel 410 occupies four symbols. The TAS 420 occupies four symbols. The RAS 430 occupies four symbols. The data 440 occupies 34 symbols. The ACK 450 occupies four symbols. Each symbol is 17.7 microseconds. Each of GP1, GP2, and GP5 occupies one symbol or 17.7 microseconds. GP3 occupies one symbol and 8.33 microseconds, for a total of 26.03 microseconds. GP4 occupies two symbols or 35.4 microseconds.

FIG. 5 is a block diagram illustrating an example subframe structure in the central six PRBs 500 of the first subframe in each frame, in accordance with some embodiments. Each of the six PRBs includes three subcarriers (as the single PRB 400). As shown, the six PRBs 500 include, in order: a four symbol sync 510 (corresponding to the control channel 410), a single symbol sync 515 (corresponding to GP1), a four symbol sync 520 (corresponding to TAS 420), GP2, a four symbol block 530 (corresponding to RAS 430), GP3, BCH 540 occupying two symbols from the data 440, paging and discovery block 550 occupying 32 symbols from the data 440, GP4, a four symbol block 560 (corresponding to ACK 450), and GP5. Each RU occupies three subcarriers by four symbols. The BCH 540 occupies half an RU per PRB by six PRBs, reaching a total of three RUs, with 30 bits of information bits. The paging and discovery block 550 occupies 8 RUs per PRB by 6 PRBs, reaching a total of 48 RUs.

The functions of the channels discussed above are summarized in Table 2. An embodiment of the contents and payloads of each channel are summarized in Table 3.

TABLE 2

Physical channel functions

| Channel | Functions |
|---|---|
| Control channel (DL, from nUE to wUE) | DL/UL indication, broadcasting indication, RA resource indication Resource assignment for UL transmission |
| TAS channel (transmitted from the transmitter) | Allow interference measurement at receiver for collision avoidance among cells Resource assignment for DL transmission |
| RAS channel (transmitted from the receiver) | Allow interference measurement at transmitter for collision avoidance among cells CSI reporting, power head room reporting |
| Data channel (transmitted from the transmitter) | DL/UL data transmission |
| ACK channel (transmitted from the receiver) | ACK reporting Buffer status reporting |
| Paging/discovery channel | Paging/discovery signal. nUE ID collision avoidance |
| Synchronization channel | Synchronization |
| Broadcast channel | System information broadcasting |

TABLE 3

Physical channel contents and payload

| Channel | | Content | Payload |
|---|---|---|---|
| Control channel | DL subframe | 1 bit DL/UL indication + 2 bits repetition (111) + 4 bits broadcasting resource indication (indicate up to 15 subchannels, 1111 reserved for non- | 10 bits |

TABLE 3-continued

Physical channel contents and payload

| Channel | | Content | Payload |
|---|---|---|---|
| | | broadcasting), 3 bits CRC, scrambled with 10 bits nUE temp ID | |
| | UL subframe | 1 bit DL/UL indication + 2 bits repetition (000), 4 bits resource indication (indicate up to 15 subchannels, 0000 reserved), 3 bits CRC, scrambled. with 20 bits wUE temp ID | 10 bits |
| TAS channel | DL subframe | NDI (1 bits) + 2 bits repetition, CRC (3 bits), symbol level scrambling by 20 bits wUE temp ID | 6 bits |
| | UL subframe | NDI (1 bit) + 2 bits repetition, CRC (3 bits), symbol level scrambling by 20 wUE temp ID | 6 bits |
| RAS channel | DL subframe | MCS (4 bits), DL PHR (2 bits), CRC (4 bits), symbol level scrambling by 20 bits wUE temp ID | 10 bits |
| | UL subframe | MCS (4 bits), DL PHR (2 bits), CRC (4 bits), symbol level scrambling by 20 bits wUE temp ID | 10 bits |
| ACK channel | DL subframe | A/N (2 bits, 1 for ACK), BSR (4 bits), CRC (4 bits), symbol-level scrambling by wUE temp ID (20 bits) | 10 bits |
| | UL subframe | A/N (1 bit, 10 repetition), symbol-level scrambling by wUE temp ID (20 bits) | 10 bits |
| Paging/discovery channel | | Paging or discovery indication (0/1, repetite by 10 times, 0 for discovery, 1 for paging), scrambled by 10 bit nUE temp ID (for discovery, the temp ID is temp ID generated from discovery RU index) | 10 bits |
| Broadcast channel | | System bandwidth (1 bit, 0 for 1.4 MHz, 1 for 20 MHz). SFN (10 bits). System info reserved for accomodate differente frame length | 30 bits |
| Notes | | 1) BSR is only transmitted in control PRA 2) BSR in UL subframe: BSR transmitted in the data channel in the MAC header, in the control PRA | |

Some examples of defined identifiers are summarized in Table 4.

TABLE 4

Identifiers

| | Function | Length |
|---|---|---|
| nUE MAC address | Unique ID of nUE | 48 bits |
| wUE MAC address | Unique ID of wUE | 48 bits |
| nUE temp ID | Generated from nUE MAC address. Used in addressing nUE in communication | 20 bits (10 bits nUE ID segment + 10 0 bits) |
| wUE temp ID | Generated from wUE MAC address. Used in addressing wUE in communication | 20 bits (10 bits nUE ID segment + 10 bits wUE ID segment) |
| RA ID | Used by wUE for RA during initial access | 20 bits, a portion of the IDs in the wUE temp ID pool is used as RA ID |
| Broadcasting ID | Define one common broadcast ID to be used by all nUEs. | 20 bits, taken from the nUE temp ID pool |

Figure 6:
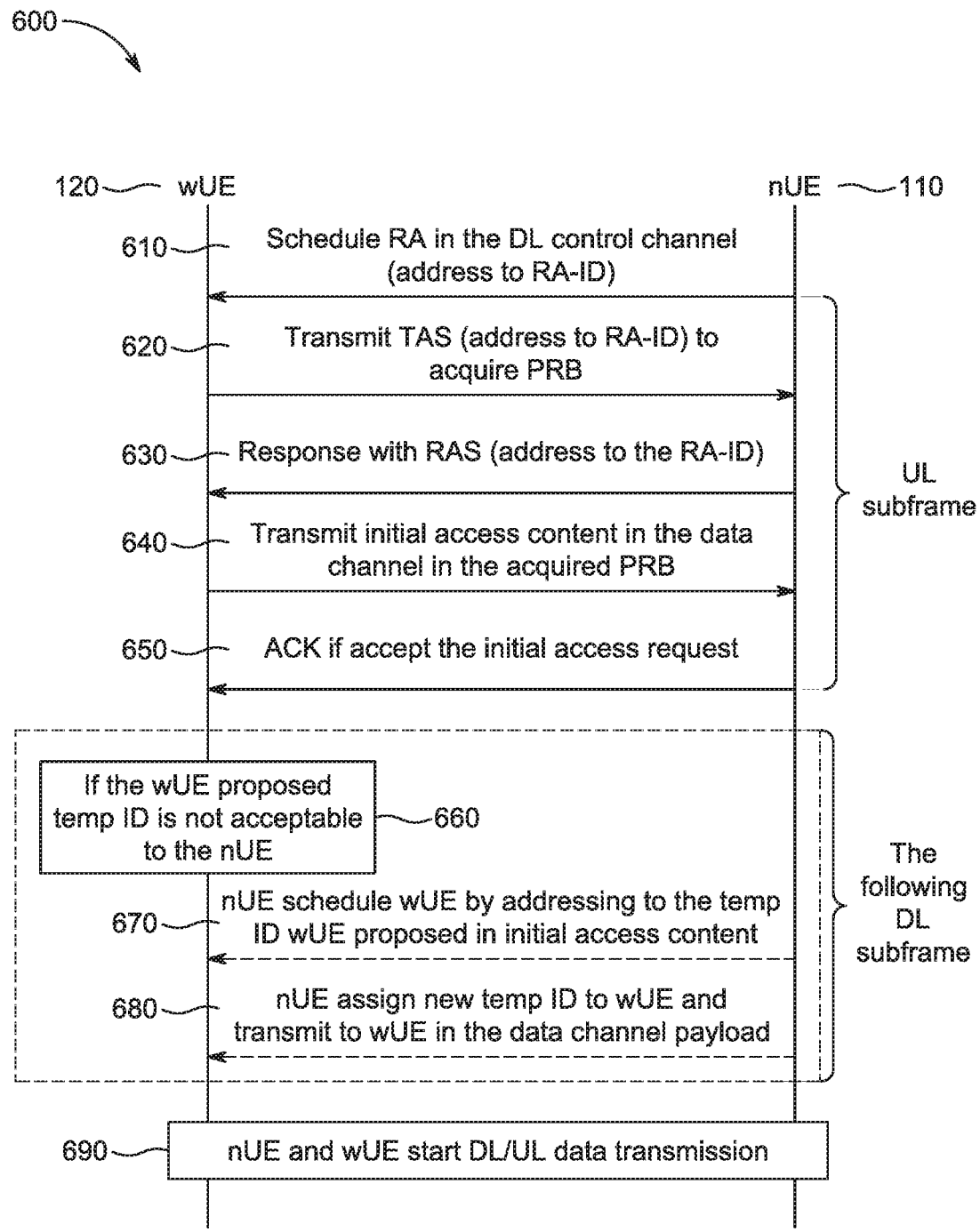
FIG. 6 is a flow chart of an example initial access method, in accordance with some embodiments.

FIG. 6 is a flow chart of an example initial access method 600. The method 600 is implemented by a nUE 110 and a wUE 220. The initial access method 600 is implemented in wUE 120 admission to a PAN 150 of the nUE. The initial access signal exchange of the method 600 is embedded in data transmission. Each nUE 110 defines a RA-ID to be used by all the wUEs 120 doing initial access to the nUE 110. Mapping between RA-ID and nUE 110 is 1:1. Mapping between RA-ID and wUE 12—is 1:M (multiple). RA resource scheduling is used by the nUE 110 in the primary control channel and includes the initial access and the scheduling request (discussed in conjunction with FIG. 7). RA resource acquisition is used by each of the new wUE(s) 120 in the TAS channel and by the nUE in the RAS channel. RA content transmission is used by each of the new wUE(s) in the data channel.

At operation 610, the nUE 110 schedules RA in the DL control channel, addressed to the RA-ID of the nUE 110. The nUE 110 encodes the scheduling of the RA. The PRB used in transmitting the control information is generated from the RA-ID. The control information is scrambled with RA-ID.

Operations 620-650 take place in the UL subframe. At operation 620, the wUE 120 transmits TAS payload, addressed to the RA-ID to acquire a PRB. The wUE 120 encodes the TAS payload for transmission. The wUE 120 transmits the TAS based on the resource scheduling information received from the control channel. The wUE 120 randomly selects one of the PRBs scheduled for RA transmission. The TAS payload is scrambled with the RA-ID.

At operation 630, the nUE 110 responds with RAS payload addressed to the RA-ID. The nUE 110 encodes the RAS payload. The nUE 110 feedbacks the RAS in the same PRB in which it received the TAS addressed to the RA-ID. The RAS payload is scrambled with the RA-ID. The nUE 110 decodes the TAS payload and encodes the RAS payload, before moving to operation 630.

At operation 640, the wUE 120 transmits initial access content in the data channel in the acquired PRB. The wUE 120 encodes the initial access content for transmission. The wUE 120 transmits the initial access content in the data channel upon receiving the RAS from the nUE 110. The initial access content includes authentication information (e.g., wUE 120 MAC (media access control) address), security key information, and the wUE 120 proposed temp ID.

At operation 650, the nUE 110 transmits ACK if it accepts the initial access request. The nUE 110 encodes the ACK for transmission. The ACK payload is scrambled with the wUE 120 temp ID.

Operations 660-680 take place in the DL subframe following the UL subframe of operations 620-650. At operation 660, the wUE 120 determines whether the wUE 120 proposed temp ID is acceptable to the nUE 110. If the wUE 120 proposed temp ID is acceptable, the method 600 continues to operation 690 (skipping operations 670 and 680). If the wUE 120 proposed temp ID is not acceptable, the method 600 continues to operation 670.

At operation 670, the nUE 110 schedules the wUE 120 by addressing to the temp ID that the wUE 120 proposed in the initial access content. The nUE 110 schedules the wUE 120 in the next available DL subframe.

At operation 680, the nUE 110 assigns a new temp ID to the wUE 120 and transmits the new temp ID to the wUE 120 in the data channel payload. The new temp ID is transmitted as a RRC signal in the logical control channel.

Alternatively, if the wUE 120 proposed temp ID is acceptable to the nUE 110, the temp ID becomes the temp ID of the wUE 120 used throughout the wUE 120 wake-up period. A logical control packet is defined for the initial access content.

At operation 690, the nUE 110 and the wUE 120 start DL/UL data transmission. The nUE 110 encodes instructions for starting the DL or UL data transmission.

Figure 7:
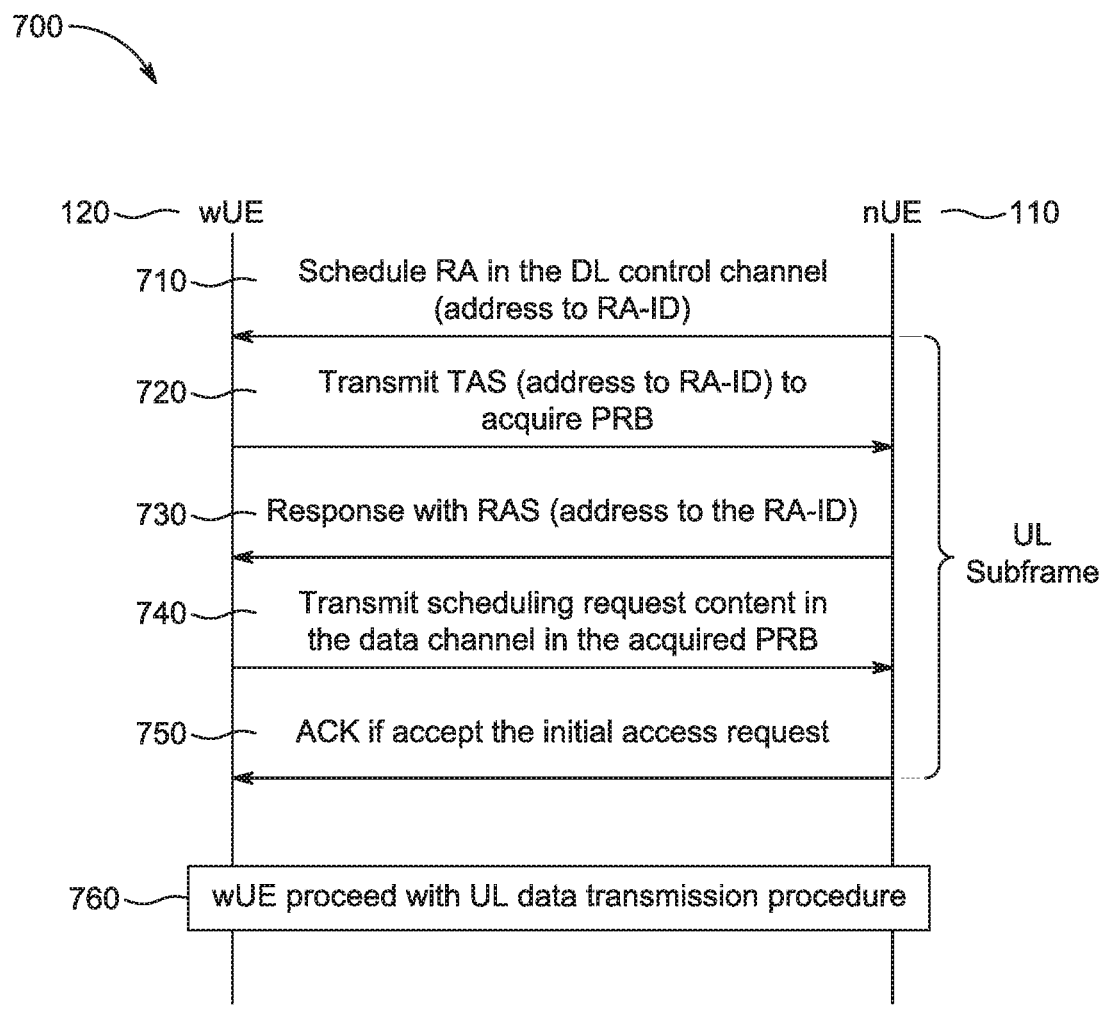
FIG. 7 is a flow chart of an example scheduling request method in an uplink subframe, in accordance with some embodiments.

FIG. 7 is a flow chart of an example scheduling request method 700 in an uplink subframe. The method 700 is implemented with a nUE 110 and a wUE 120. The scheduling request method 700 is implemented when an active wUE 120 has UL traffic to transmit. The scheduling request is sent using the same procedure as in initial access (described in conjunction with FIG. 6). The scheduling request content is transmitted in the data channel. A logical control packet type is defined for scheduling request content.

In some cases, the scheduling request is transmitted in the UL subframe. For mission critical UL traffic, the scheduling request may be transmitted in the UL subframe using RAS channel. The nUE 110 may decide to drop other ongoing DL traffic and turn a DL subframe into an UL subframe upon mission critical scheduling request.

At operation 710, the nUE 110 schedules a RA, addressed to a RA-ID of the nUE 110, in the DL control channel. The PRB used in transmitting the control information is generated from the RA-ID. The control information is scrambled with the RA-ID.

Operations 720-750 take place in a UL subframe. At operation 720, the wUE 120 transmits TAS, addressed to the RA-ID, to acquire PRB. The wUE 120 transmits TAS based on the resource scheduling information received from the control channel. The wUE 120 randomly select one of the PRBs scheduled for RA transmission. The TAS payload is scrambled with the RA-ID.

At operation 730, the nUE 110 responds to the TAS with RAS, addressed to the RA-ID. The nUE 110 feedbacks RAS in the same PRB that the TAS addressed to RA-ID is received. The RAS payload is scrambled with the RA-ID.

At operation 740, the wUE 120 transmits scheduling request content in the data channel in the acquired PRB. The wUE 120 transmits the scheduling request content in the data channel upon receiving RAS from the nUE 110. The scheduling request content includes the wUE 120 temp ID. In some cases, user data is transmitted together with the scheduling request.

At operation 750, the nUE 110 transmits an ACK if the nUE 110 accepts the initial access request, in order to indicate the acceptance. The ACK payload is scrambled with the wUE 120 temp ID.

At operation 760, the wUE 120 proceeds with the UL data transmission procedure. The nUE 110 schedules the wUE 120 uplink transmission in the next available UL subframe. Data is transmitted from the wUE 120 to the nUE 110.

The scheduling request method in the UL subframe is as follows.

The nUE 110 schedules a RA resource in the control channel. The PRB used in transmitting the control information is generated from the RA-ID. The control information is scrambled with the RA-1D.

The wUE 120 transmit RAS in the same PRBs that the RA is scheduled in by the control channel. The RAS payload carries the RA indication. The RAS payload is scrambled with the RA-ID.

In response to the RAS from the wUE 120, The nUE 110 switches the subframe from DL to UL to allow the wUE 120 transmit mission critical data.

Figure 8:
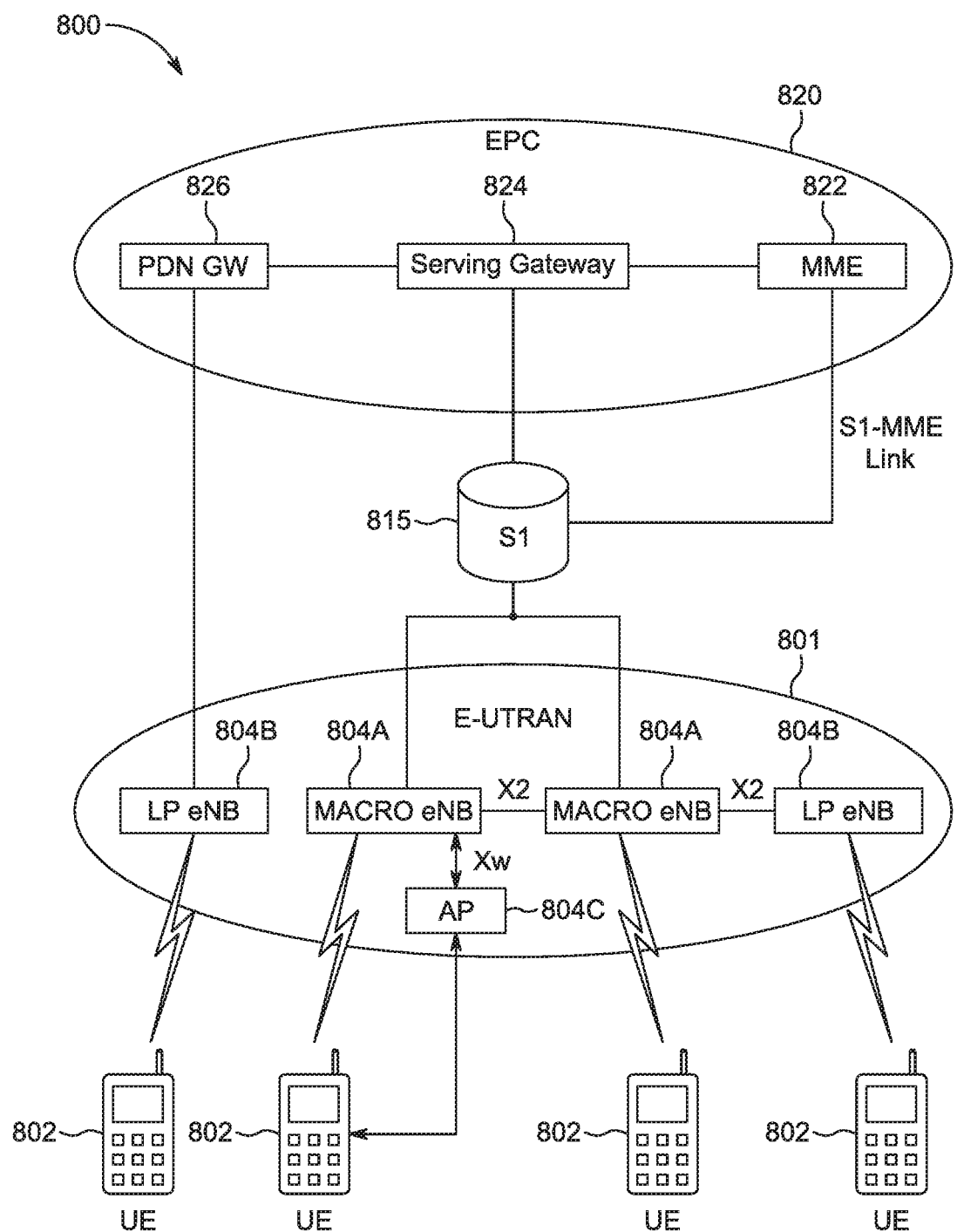
FIG. 8 is a functional diagram of a wireless network in accordance with some embodiments.

FIG. 8 shows an example of a portion of an end-to-end network architecture of a Long Term Evolution (LTE) network with various components of the network in accordance with some embodiments. As used herein, an LTE network refers to both LTE and LTE Advanced (LTE-A) networks as well as other versions of LTE networks to be developed. The network 800 may comprise a radio access network (RAN) (e.g., as depicted, the E-UTRAN or evolved universal terrestrial radio access network) 801 and core network 820 (e.g., shown as an evolved packet core (EPC)) coupled together through an S1 interface 815. For convenience and brevity, only a portion of the core network 820, as well as the RAN 801, is shown in the example.

The core network 820 may include a mobility management entity (MME) 822, serving gateway (serving GW) 824, and packet data network gateway (PDN GW) 826. The RAN 801 may include evolved node Bs (eNBs) 804 (which may operate as base stations) for communicating with user equipment (UE) 802. The eNBs 804 may include macro eNBs 804*a* and low power (LP) eNBs 804*b*. The UEs 802 may correspond to the nUE 110 or the wUE 120 of FIG. 1. The eNBs 804 may correspond to the E-UTRAN BS 130 of FIG. 1. The core network 820 may correspond to the EPC 140 of FIG. 1.

The MME 822 may be similar in function to the control plane of legacy Serving GPRS Support Nodes (SGSN). The MME 822 may manage mobility aspects in access such as gateway selection and tracking area list management. The serving GW 824 may terminate the interface toward the RAN 801, and route data packets between the RAN 801 and the core network 820. In addition, the serving GW 824 may be a local mobility anchor point for inter-eNB handovers and also may provide an anchor for inter-3GPP mobility. Other responsibilities may include lawful intercept, charging, and some policy enforcement. The serving GW 824 and the MME 822 may be implemented in one physical node or separate physical nodes.

The PDN GW 826 may terminate a SGi interface toward the packet data network (PDN). The PDN GW 826 may route data packets between the EPC 820 and the external PDN, and may perform policy enforcement and charging data collection. The PDN GW 826 may also provide an anchor point for mobility devices with non-LTE access. The external PDN can be any kind of IP network, as well as an IP Multimedia Subsystem (IMS) domain. The PDN GW 826 and the serving GW 824 may be implemented in a single physical node or separate physical nodes.

The eNBs 804 (macro and micro) may terminate the air interface protocol and may be the first point of contact for a UE 802. In some embodiments, an eNB 804 may fulfill various logical functions for the RAN 801 including, but not limited to, RNC (radio network controller functions) such as radio bearer management, uplink and downlink dynamic radio resource management and data packet scheduling, and mobility management. In accordance with embodiments, UEs 802 may be configured to communicate orthogonal frequency division multiplexed (OFDM) communication signals with an eNB 804 over a multicarrier communication channel in accordance with an OFDMA communication technique. The OFDM signals may comprise a plurality of orthogonal subcarriers.

The S1 interface 815 may be the interface that separates the RAN 801 and the EPC 820. It may be split into two parts: the S1-U, which may carry traffic data between the eNBs 804 and the serving GW 824, and the S1-MME, which may be a signaling interface between the eNBs 804 and the MME 822. The X2 interface may be the interface between eNBs 804. The X2 interface may comprise two parts, the X2-C and X2-U. The X2-C may be the control plane interface between the eNBs 804, while the X2-U may be the user plane interface between the eNBs 804.

With cellular networks, LP cells 804b may be typically used to extend coverage to indoor areas where outdoor signals do not reach well, or to add network capacity in areas with dense usage. In particular, it may be desirable to enhance the coverage of a wireless communication system using cells of different sizes, macrocells, microcells, picocells, and femtocells, to boost system performance. The cells of different sizes may operate on the same frequency band, or may operate on different frequency bands with each cell operating in a different frequency band or only cells of different sizes operating on different frequency bands. As used herein, the term LP eNB refers to any suitable relatively LP eNB for implementing a smaller cell (smaller than a macro cell) such as a femtocell, a picocell, or a microcell. Femtocell eNBs may be typically provided by a mobile network operator to its residential or enterprise customers. A femtocell may be typically the size of a residential gateway or smaller and generally connect to a broadband line. The femtocell may connect to the mobile operator's mobile network and provide extra coverage in a range of typically 30 to 80 meters. Thus, a LP eNB 804b might be a femtocell eNB since it is coupled through the PDN GW 826. Similarly, a picocell may be a wireless communication system typically covering a small area, such as in-building (offices, shopping malls, train stations, etc.), or more recently in-aircraft. A picocell eNB may generally connect through the X2 link to another eNB such as a macro eNB through its base station controller (BSC) functionality. Thus, LP eNB may be implemented with a picocell eNB since it may be coupled to a macro eNB 804a via an X2 interface. Picocell eNBs or other LP eNBs LP eNB 804b may incorporate some or all functionality of a macro eNB LP eNB 804a. In some cases, this may be referred to as an access point base station or enterprise femtocell.

In some embodiments, the UE 802 may communicate with an access point (AP) 804c. The AP 804c may use only the unlicensed spectrum (e.g., WiFi bands) to communicate with the UE 802. The AP 804c may communicate with the macro eNB 804A (or LP eNB 804B) through an Xw interface. In some embodiments, the AP 804c may communicate with the UE 802 independent of communication between the UE 802 and the macro eNB 804A. In other embodiments, the AP 804c may be controlled by the macro eNB 804A and use LWA, as described in more detail below.

Communication over an LTE network may be split up into 10 ms frames, each of which may contain ten 1 ms subframes. Each subframe of the frame, in turn, may contain two slots of 0.5 ms. Each subframe may be used for uplink (UL) communications from the UE to the eNB or downlink (DL) communications from the eNB to the UE. In one embodiment, the eNB may allocate a greater number of DL communications than UL communications in a particular frame. The eNB may schedule transmissions over a variety of frequency bands ($f_1$ and $f_2$). The allocation of resources in subframes used in one frequency band and may differ from those in another frequency band. Each slot of the subframe may contain 9-7 OFDM symbols, depending on the system used. In one embodiment, the subframe may contain 12 subcarriers. A downlink resource grid may be used for downlink transmissions from an eNB to a UE, while an uplink resource grid may be used for uplink transmissions from a UE to an eNB or from a UE to another UE. The resource grid may be a time-frequency grid, which is the physical resource in the downlink in each slot. The smallest time-frequency unit in a resource grid may be denoted as a resource element (RE). Each column and each row of the resource grid may correspond to one OFDM symbol and one OFDM subcarrier, respectively. The resource grid may contain resource blocks (RBs) that describe the mapping of physical channels to resource elements and physical RBs (PRBs). A PRB may be the smallest unit of resources that can be allocated to a UE. A resource block may be 180 kHz wide in frequency and 1 slot long in time. In frequency, resource blocks may be either 12×15 kHz subcarriers or 24×10.5 kHz subcarriers wide. For most channels and signals, 12 subcarriers may be used per resource block, dependent on the system bandwidth. In Frequency Division Duplexed (FDD) mode, both the uplink and downlink frames may be 10 ms and frequency (full-duplex) or time (half-duplex) separated. In Time Division Duplexed (TDD), the uplink and downlink subframes may be transmitted on the same frequency and are multiplexed in the time domain. The duration of the resource grid 400 in the time domain corresponds to one subframe or two resource blocks. Each resource grid may comprise 12 (subcarriers)*14 (symbols) =168 resource elements.

Each OFDM symbol may contain a cyclic prefix (CP) which may be used to effectively eliminate Inter Symbol Interference (ISI), and a Fast Fourier Transform (FFT) period. The duration of the CP may be determined by the highest anticipated degree of delay spread. Although distortion from the preceding OFDM symbol may exist within the CP, with a CP of sufficient duration, preceding OFDM symbols do not enter the FFT period. Once the FFT period signal is received and digitized, the receiver may ignore the signal in the CP.

There may be several different physical downlink channels that are conveyed using such resource blocks, including the physical downlink control channel (PDCCH) and the physical downlink shared channel (PDSCH). Each subframe may be partitioned into the PDCCH and the PDSCH. The PDCCH may normally occupy the first two symbols of each subframe and carries, among other things, information about the transport format and resource allocations related to the PDSCH channel, as well as H-ARQ information related to the uplink shared channel. The PDSCH may carry user data and higher layer signaling to a UE and occupy the remainder of the subframe. Typically, downlink scheduling (assigning control and shared channel resource blocks to UEs within a cell) may be performed at the eNB based on channel quality information provided from the UEs to the eNB, and then the downlink resource assignment information may be sent to each UE on the PDCCH used for (assigned to) the UE. The PDCCH may contain downlink control information (DCI) in one of a number of formats that indicate to the UE how to find and decode data, transmitted on PDSCH in the same subframe, from the resource grid. The DCI format may provide details such as number of resource blocks, resource allocation type, modulation scheme, transport block, redundancy version, coding rate etc. Each DCI format may have a cyclic redundancy code (CRC) and be scrambled with a Radio Network Temporary Identifier (RNTI) that identifies the target UE for which the PDSCH is intended. Use of the UE-specific RNTI may limit decoding of the DCI format (and hence the corresponding PDSCH) to only the intended UE.

Figure 9:
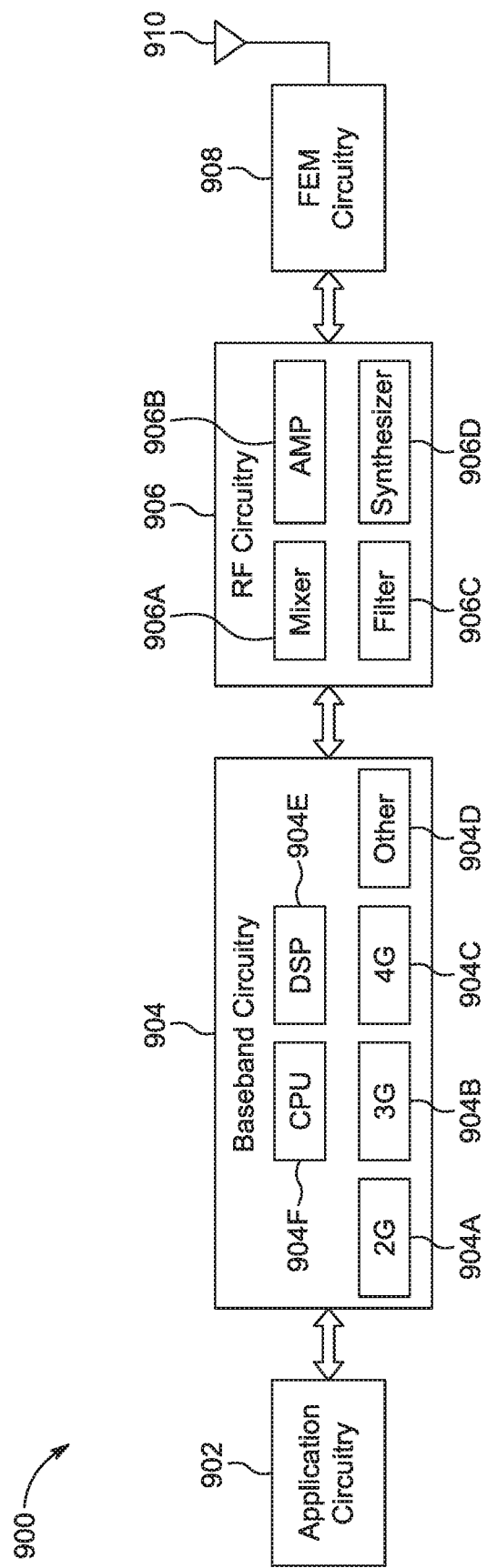
FIG. 9 illustrates components of a communication device in accordance with some embodiments.

Embodiments described herein may be implemented into a system using any suitably configured hardware and/or software. FIG. 9 illustrates components of a UE in accordance with some embodiments. At least some of the components shown may be used in an eNB or MME, for example, such as the UE 802 or eNB 804 shown in FIG. 8 or the nUE 110, wUE 120 or E-UTRAN BS 130 of FIG. 1. The UE 900 and other components may be configured to use the synchronization signals as described herein. The UE 900 may be one of the UEs 902 shown in FIG. 1 and may be a stationary, non-mobile device or may be a mobile device. In some embodiments, the UE 900 may include application circuitry 902, baseband circuitry 904, Radio Frequency (RF) circuitry 906, front-end module (FEM) circuitry 908 and one or more antennas 910, coupled together at least as shown. At least some of the baseband circuitry 904, RF circuitry 906, and FEM circuitry 908 may form a transceiver. In some embodiments, other network elements, such as the eNB may contain some or all of the components shown in FIG. 9. Other of the network elements, such as the MME, may contain an interface, such as the S1 interface, to communicate with the eNB over a wired connection regarding the UE.

The application or processing circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 904 may include circuitry such as, but not limited to, one or more single-core or multi-core processors. The baseband circuitry 904 may include one or more baseband processors and/or control logic to process baseband signals received from a receive signal path of the RF circuitry 906 and to generate baseband signals for a transmit signal path of the RF circuitry 906. Baseband processing circuitry 904 may interface with the application circuitry 902 for generation and processing of the baseband signals and for controlling operations of the RF circuitry 906. For example, in some embodiments, the baseband circuitry 904 may include a second generation (2G) baseband processor 904a, third generation (3G) baseband processor 904b, fourth generation (4G) baseband processor 904c, and/or other baseband processor(s) 904d for other existing generations, generations in development or to be developed in the future (e.g., fifth generation (5G), 9G, etc.). The baseband circuitry 904 (e.g., one or more of baseband processors 904a-d) may handle various radio control functions that enable communication with one or more radio networks via the RF circuitry 906. The radio control functions may include, but are not limited to, signal modulation/demodulation, encoding/decoding, radio frequency shifting, etc. In some embodiments, modulation/demodulation circuitry of the baseband circuitry 904 may include FFT, precoding, and/or constellation mapping/demapping functionality. In some embodiments, encoding/decoding circuitry of the baseband circuitry 904 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include elements of a protocol stack such as, for example, elements of an evolved universal terrestrial radio access network (E-UTRAN) protocol including, for example, physical (PHY), media access control (MAC), radio link control (RLC), packet data convergence protocol (PDCP), and/or radio resource control (RRC) elements. A central processing unit (CPU) 904e of the baseband circuitry 904 may be configured to run elements of the protocol stack for signaling of the PHY, MAC, RLC, PDCP and/or RRC layers. In some embodiments, the baseband circuitry may include one or more audio digital signal processor(s) (DSP) 904f. The audio DSP(s) 904f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 904 is configured to support radio communications of more than one wireless protocol may be referred to as multi-mode baseband circuitry. In some embodiments, the device can be configured to operate in accordance with communication standards or other protocols or standards, including Institute of Electrical and Electronic Engineers (IEEE) 802.16 wireless technology (Wi-Max), IEEE 802.11 wireless technology (WiFi) including IEEE 802.11 ad, which operates in the 90 GHz millimeter wave spectrum, various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 8G, etc. technologies either already developed or to be developed.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. RF circuitry 906 may include a receive signal path which may include circuitry to down-convert RF signals received from the FEM circuitry 908 and provide baseband signals to the baseband circuitry 904. RF circuitry 906 may also include a transmit signal path which may include circuitry to up-convert baseband signals provided by the baseband circuitry 904 and provide RF output signals to the FEM circuitry 908 for transmission.

In some embodiments, the RF circuitry 906 may include a receive signal path and a transmit signal path. The receive signal path of the RF circuitry 906 may include mixer circuitry 906a, amplifier circuitry 906b and filter circuitry 906c. The transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from the FEM circuitry 908 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, mixer circuitry 906a of the receive signal path may comprise passive mixers, although the scope of the embodiments is not limited in this respect.

In some embodiments, the mixer circuitry 906a of the transmit signal path may be configured to up-convert input baseband signals based on the synthesized frequency provided by the synthesizer circuitry 906d to generate RF output signals for the FEM circuitry 908. The baseband signals may be provided by the baseband circuitry 904 and may be filtered by filter circuitry 906c. The filter circuitry 906c may include a low-pass filter (LPF), although the scope of the embodiments is not limited in this respect.

In some embodiments, the mixer circuitry 906a of the receive signal path and the mixer circuitry 906a of the transmit signal path may include two or more mixers and may be arranged for quadrature downconversion and/or upconversion respectively. In some embodiments, the mixer circuitry 906a of the receive signal path and the mixer circuitry 906a of the transmit signal path may include two or more mixers and may be arranged for image rejection (e.g., Hartley image rejection). In some embodiments, the mixer circuitry 906a of the receive signal path and the mixer circuitry 906a may be arranged for direct downconversion and/or direct upconversion, respectively. In some embodiments, the mixer circuitry 906a of the receive signal path and the mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 904 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

The synthesizer circuitry 906d may be configured to synthesize an output frequency for use by the mixer circuitry 906a of the RF circuitry 906 based on a frequency input and a divider control input. In some embodiments, the synthesizer circuitry 906d may be a fractional N/N+1 synthesizer.

In some embodiments, frequency input may be provided by a voltage controlled oscillator (VCO), although that is not a requirement. Divider control input may be provided by either the baseband circuitry 904 or the applications processor 902 depending on the desired output frequency. In some embodiments, a divider control input (e.g., N) may be determined from a look-up table based on a channel indicated by the applications processor 902.

Synthesizer circuitry 906d of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 906 may include an IQ/polar converter.

FEM circuitry 908 may include a receive signal path which may include circuitry configured to operate on RF signals received from one or more antennas 910, amplify the received signals and provide the amplified versions of the received signals to the RF circuitry 906 for further processing. FEM circuitry 908 may also include a transmit signal path which may include circuitry configured to amplify signals for transmission provided by the RF circuitry 906 for transmission by one or more of the one or more antennas 910.

In some embodiments, the FEM circuitry 908 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission (e.g., by one or more of the one or more antennas 910.

In some embodiments, the UE 900 may include additional elements such as, for example, memory/storage, display, camera, sensor, and/or input/output (I/O) interface as described in more detail below. In some embodiments, the UE 900 described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 900 may include one or more user interfaces designed to enable user interaction with the system and/or peripheral component interfaces designed to enable peripheral component interaction with the system. For example, the UE 900 may include one or more of a keyboard, a keypad, a touchpad, a display, a sensor, a non-volatile memory port, a universal serial bus (USB) port, an audio jack, a power supply interface, one or more antennas, a graphics processor, an application processor, a speaker, a microphone, and other I/O components. The display may be an LCD or LED screen including a touch screen. The sensor may include a gyro sensor, an accelerometer, a proximity sensor, an ambient light sensor, and a positioning unit. The positioning unit may communicate with components of a positioning network, e.g., a global positioning system (GPS) satellite.

The antennas 910 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 910 may be effectively separated to take advantage of spatial diversity and the different channel characteristics that may result.

Although the UE 900 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 10:
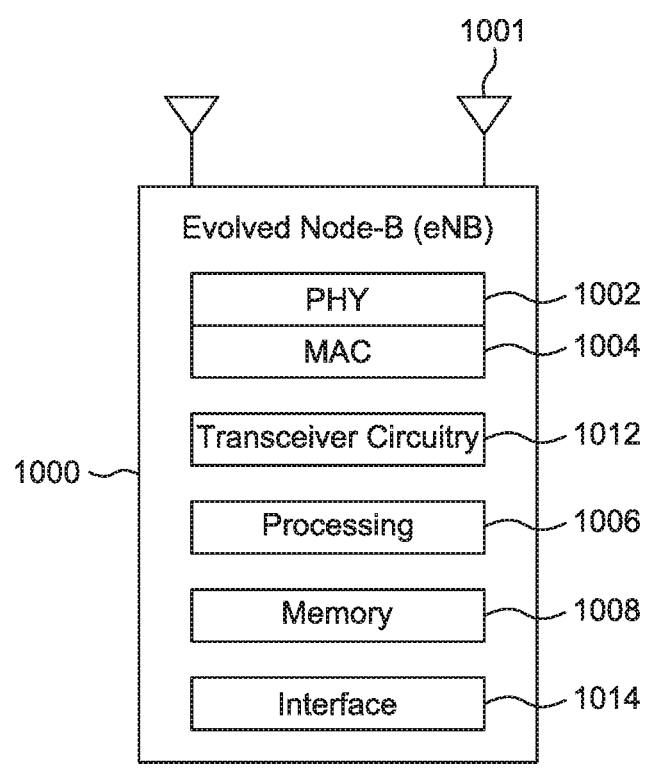
FIG. 10 illustrates a block diagram of a communication device in accordance with some embodiments.

FIG. 10 is a block diagram of a communication device in accordance with some embodiments. The device may be a UE or eNB, for example, such as the UE 802 or eNB 804 shown in FIG. 8 or the nUE 110, wUE 120, or E-UTRAN BS 130 of FIG. 1 that may be configured to track the UE as described herein. The physical layer circuitry 1002 may perform various encoding and decoding functions that may include formation of baseband signals for transmission and decoding of received signals. The communication device 1000 may also include medium access control layer (MAC) circuitry 1004 for controlling access to the wireless medium. The communication device 1000 may also include processing circuitry 1006, such as one or more single-core or multi-core processors, and memory 1008 arranged to perform the operations described herein. The physical layer circuitry 1002, MAC circuitry 1004 and processing circuitry 1006 may handle various radio control functions that enable communication with one or more radio networks compatible with one or more radio technologies. The radio control functions may include signal modulation, encoding, decoding, radio frequency shifting, etc. For example, similar to the device shown in FIG. 2, in some embodiments, communication may be enabled with one or more of a WMAN, a WLAN, and a WPAN. In some embodiments, the communication device 1000 can be configured to operate in accordance with 3GPP standards or other protocols or standards, including WiMax, WiFi, WiGig, GSM, EDGE, GERAN, UMTS, UTRAN, or other 3G, 3G, 4G, 8G, etc. technologies either already developed or to be developed. The communication device 1000 may include transceiver circuitry 1012 to enable communication with other external devices wirelessly and interfaces 1014 to enable wired communication with other external devices. As another example, the transceiver circuitry 1012 may perform various transmission and reception functions such as conversion of signals between a baseband range and a Radio Frequency (RF) range.

The antennas 1001 may comprise one or more directional or omnidirectional antennas, including, for example, dipole antennas, monopole antennas, patch antennas, loop antennas, microstrip antennas or other types of antennas suitable for transmission of RF signals. In some MIMO embodiments, the antennas 1001 may be effectively separated to take advantage of spatial diversity and the different channel characteristics that may result.

Although the communication device 1000 is illustrated as having several separate functional elements, one or more of the functional elements may be combined and may be implemented by combinations of software-configured elements, such as processing elements including DSPs, and/or other hardware elements. For example, some elements may comprise one or more microprocessors, DSPs, FPGAs, ASICs, RFICs and combinations of various hardware and logic circuitry for performing at least the functions described herein. In some embodiments, the functional elements may refer to one or more processes operating on one or more processing elements. Embodiments may be implemented in one or a combination of hardware, firmware and software. Embodiments may also be implemented as instructions stored on a computer-readable storage device, which may be read and executed by at least one processor to perform the operations described herein.

Figure 11:
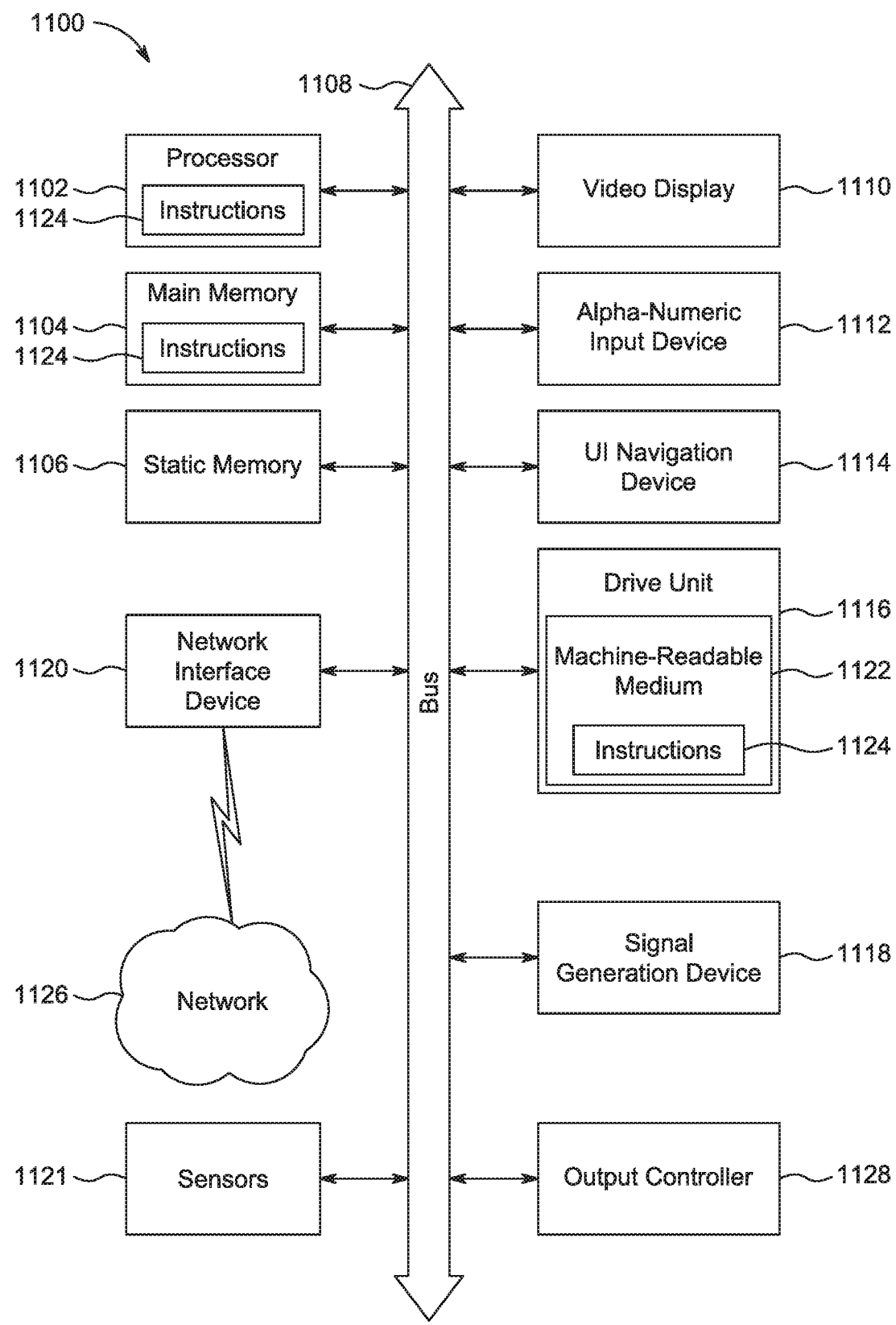
FIG. 11 illustrates another block diagram of a communication device in accordance with some embodiments.

FIG. 11 illustrates another block diagram of a communication device 1100 in accordance with some embodiments. The communication device 1100 may correspond to the nUE 110 or the wUE 120 of FIG. 1. In alternative embodiments, the communication device 1100 may operate as a standalone device or may be connected (e.g., networked) to other communication devices. In a networked deployment, the communication device 1100 may operate in the capacity of a server communication device, a client communication device, or both in server-client network environments. In an example, the communication device 1100 may act as a peer communication device in peer-to-peer (P2P) (or other distributed) network environment. The communication device 1100 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The communication device 1100 may further include a display unit 1110, an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The communication device 1100 may additionally include a storage device (e.g., drive unit) 1116, a signal generation device 1118 (e.g., a speaker), a network interface device 1120, and one or more sensors 1121, such as a global positioning system (GPS) sensor, compass, accelerometer, or other sensor. The communication device 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1116 may include a communication device readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the communication device 1100. In an example, one or any combination of the hardware processor 1102, the main memory 1104, the static memory 1106, or the storage device 1116 may constitute communication device readable media.

While the communication device readable medium 1122 is illustrated as a single medium, the term "communication device readable medium" may include a single medium or multiple media (e.g., a centralized or distributed database, and/or associated caches and servers) configured to store the one or more instructions 1124.

The term "communication device readable medium" may include any medium that is capable of storing, encoding, or carrying instructions for execution by the communication device 1100 and that cause the communication device 1100 to perform any one or more of the techniques of the present disclosure, or that is capable of storing, encoding or carrying data structures used by or associated with such instructions. Non-limiting communication device readable medium examples may include solid-state memories, and optical and magnetic media. Specific examples of communication device readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device readable media may include non-transitory communication device readable media. In some examples, communication device readable media may include communication device readable media that is not a transitory propagating signal.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), MIMO, or multiple-input single-output (MISO) techniques. In some examples, the network interface device 1120 may wirelessly communicate using Multiple User MIMO techniques. The term "transmission medium" shall be taken to include any intangible medium that is capable of storing, encoding or carrying instructions for execution by the communication device 1100, and includes digital or analog communications signals or other intangible medium to facilitate communication of such software.

The subject technology is described below in conjunction with various examples.

Example 1 is an apparatus of a network user equipment (nUE), the apparatus comprising: processing circuitry; and memory, the processing circuitry to: schedule a RA (random access) resource in a control channel; decode, in response to scheduling the RA resource, a TAS (transmitter resource acquisition and sounding) payload, received from a wUE (wearable user equipment) in a PRB (physical resource block) addressed to a RA-ID (random access identifier) associated with the nUE: encode, in response to decoding the TAS payload, a RAS (receiver resource acknowledgement and sounding) payload in the PRB; decode initial access content received via a data channel from the wUE, the initial access content including a proposed temp ID (temporary identifier) for addressing the wUE; and encode, in response to the initial access content, an ACK (acknowledgement), addressed to the wUE, to accept initial access of the wUE.

Example 2 is the apparatus of Example 1, wherein the processing circuitry is further to: schedule the wUE in a next available subframe by addressing to the proposed temp ID for addressing the wUE in the initial access content; if the proposed temp ID is acceptable to the nUE: assign the proposed temp ID as the temp ID for addressing the wUE; and if the proposed temp ID is not acceptable to the nUE: assign a new temp ID to the wUE and encode for transmission of the new temp ID as a RRC (radio resource control) signal in the control channel.

Example 3 is the apparatus of Example 2, wherein the processing circuitry is further to: encode instructions for initiating of a downlink or uplink data transmission between the nUE and the wUE.

Example 4 is the apparatus of any of Examples 1-2, the TAS payload being encoded based on scheduling information in the control channel.

Example 5 is the apparatus of any of Examples 1-2, the RAS payload being scrambled with the RA-ID, and the TAS payload being scrambled with the RA-ID.

Example 6 is the apparatus of any of Examples 1-2, wherein the RA-ID is associated with the nUE and a plurality of wUEs, including the wUE.

Example 7 is the apparatus of any of Examples 1-2, wherein the processing circuitry comprises a baseband processor.

Example 8 is the apparatus of any of Examples 1-2, further comprising transceiver circuitry to: receive the TAS payload; transmit the RAS payload; receive the initial access content; and transmit the ACK.

Example 9 is the apparatus of Example 8, further comprising an antenna coupled with the transceiver circuitry.

Example 10 is an apparatus of a wearable user equipment (wUE), the apparatus comprising: processing circuitry; and memory, the processing circuitry to: decode a scheduled RA (random access) resource in a control channel; encode, in response decoding to the scheduled RA resource, for transmission of a TAS (transmitter resource acquisition and sounding) payload based on resource scheduling information in the control channel, the TAS payload being encoded within a PRB (physical resource block) addressed to a RA-ID (RA identifier); decode a feedback RAS payload within the PRB addressed to the RA-ID; encode, in response to decoding the feedback RAS payload, for transmission of a scheduling request in a data channel; decode an ACK (acknowledgement) payload accepting the scheduling request; and schedule, in response to decoding the ACK, an uplink transmission to a nUE associated with the RA-ID in a next available uplink subframe.

Example 11 is the apparatus of Example 10, wherein the RA-ID is associated with the nUE and a plurality of wUEs, including the wUE.

Example 12 is the apparatus of Example 10, wherein the RA-ID is identified in the decoded RA resource, and wherein control information is scrambled with the RA-ID.

Example 13 is the apparatus of Example 10, the RAS payload being scrambled with the RA-ID, and the TAS payload being scrambled with the RA-ID.

Example 14 is the apparatus of Example 10, wherein the processing circuitry is further to: select, from among the PRBs scheduled for RA transmission, the PRB for encoding the TAS payload.

Example 15 is the apparatus of Example 10, wherein the processing circuitry is further to: encode, within the scheduling request, a temp ID for addressing the wUE.

Example 16 is the apparatus of Example 15, wherein the ACK payload is scrambled with the temp ID for addressing the wUE.

Example 17 is the apparatus of Example 10, wherein the processing circuitry is further to: encode for transmission of user data together with the scheduling request.

Example 18 is a machine-readable medium storing instructions for execution by processing circuitry of a network user equipment (nUE), the instructions causing the processing circuitry to: schedule a RA (random access) resource in a PRB (physical resource block) in a control channel; decode, in response to scheduling the RA resource, a RAS (receiver resource acknowledgement and sounding) payload received from a wUE (wearable user equipment) in the PRB in which the RA resource was scheduled; and switch, in response to the RAS payload, a subframe from downlink to uplink to allow the wUE to transmit mission critical data.

Example 19 is the machine-readable medium of Example 18, wherein the PRB in the control channel is generated from a RA-ID (RA identifier), and wherein control information is scrambled with the RA-ID.

Example 20 is the machine-readable medium of Example 18, wherein the RAS payload carries a RA indication, and wherein the RAS payload is scrambled with a RA-ID (RA identifier).

Example 21 is an apparatus of a network user equipment (nUE), the apparatus comprising: means for scheduling a RA (random access) resource in a control channel; means for decoding, in response to scheduling the RA resource, a TAS (transmitter resource acquisition and sounding) payload, received from a wUE (wearable user equipment) in a PRB (physical resource block) addressed to a RA-ID (random access identifier) associated with the nUE; means for encoding, in response to decoding the RAS payload, a RAS (receiver resource acknowledgement and sounding) payload in the PRB; means for decoding initial access content received via a data channel from the wUE, the initial access content including a proposed temp ID (temporary identifier) for addressing the wUE; and means for encoding, in response to the initial access content, an ACK (acknowledgement), addressed to the wUE, to accept initial access of the wUE.

Example 22 is the apparatus of Example 21, further comprising: means for scheduling the wUE in a next available subframe by addressing to the proposed temp ID for addressing the wUE in the initial access content; if the proposed temp ID is acceptable to the nUE: means for assigning the proposed temp ID as the temp 1D for addressing the wUE; and if the proposed temp ID is not acceptable to the nUE: means for assigning a new temp ID to the wUE and encode for transmission of the new temp ID as a RRC (radio resource control) signal in the control channel.

Although an embodiment has been described with reference to specific example embodiments, it will be evident that various modifications and changes may be made to these embodiments. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a network user equipment (nUE), the apparatus comprising:
   processing circuitry; and memory, the processing circuitry to:
   schedule a RA (random access) resource in a control channel;
   decode, in response to scheduling the RA resource, a TAS (transmitter resource acquisition and sounding) payload, received from a wUE (wearable user equipment) in a PRB (physical resource block) addressed to a RA-ID (random access identifier) associated with the nUE;
   encode, in response to decoding the TAS payload, a RAS (receiver resource acknowledgement and sounding) payload in the PRB;
   decode initial access content received via a data channel from the wUE, the initial access content including a proposed temp ID (temporary identifier) for addressing the wUE;
   encode, in response to the initial access content, an ACK (acknowledgement), addressed to the wUE, to accept initial access of the wUE; and
   switch a subframe from downlink to uplink.

2. The apparatus of claim 1, wherein the processing circuitry is further to:
   schedule the wUE in a next available subframe by addressing to the proposed temp ID for addressing the wUE in the initial access content;
   if the proposed temp ID is acceptable to the nUE: assign the proposed temp ID as the temp ID for addressing the wUE; and
   if the proposed temp ID is not acceptable to the nUE: assign a new temp ID to the wUE and encode for transmission of the new temp ID as a RRC (radio resource control) signal in the control channel.

3. The apparatus of claim 2, wherein the processing circuitry is further to:
   encode instructions for initiating of a downlink or uplink data transmission between the nUE and the wUE.

4. The apparatus of claim 1, the TAS payload being encoded based on scheduling information in the control channel.

5. The apparatus of claim 1, the RAS payload being scrambled with the RA-ID, and the TAS payload being scrambled with the RA-ID.

6. The apparatus of claim 1, wherein the RA-ID is associated with the nUE and a plurality of wUEs, including the wUE.

7. The apparatus of claim 1, wherein the processing circuitry comprises a baseband processor.

8. The apparatus of claim 1, further comprising transceiver circuitry to:
receive the TAS payload;
transmit the RAS payload;
receive the initial access content; and
transmit the ACK.

9. The apparatus of claim 8, further comprising an antenna coupled with the transceiver circuitry.

10. An apparatus of a wearable user equipment (wUE), the apparatus comprising:
processing circuitry; and memory, the processing circuitry to:
decode a scheduled RA (random access) resource in a control channel from a nUE (network user equipment);
encode for transmission to the nUE, in response decoding to the scheduled RA resource, a TAS (transmitter resource acquisition and sounding) payload based on resource scheduling information in the control channel, the TAS payload being encoded within a PRB (physical resource block) addressed to a RA-ID (RA identifier);
decode a feedback RAS (receiver resource acknowledgement and sounding) payload within the PRB addressed to the RA-ID from the nUE;
encode for transmission to the nUE, in response to decoding the feedback RAS payload, a scheduling request in a data channel;
decode an ACK (acknowledgement) payload from the nUE accepting the scheduling request; and
schedule, in response to decoding the ACK, an uplink transmission to the nUE wherein the nUE is associated with the RA-ID in a next available uplink subframe.

11. The apparatus of claim 10, wherein the RA-ID is associated with the nUE and a plurality of wUEs, including the wUE.

12. The apparatus of claim 10, wherein the RA-ID is identified in the decoded RA resource, and wherein control information is scrambled with the RA-ID.

13. The apparatus of claim 10, wherein the processing circuitry is further to:
select, from among a plurality of PRBs scheduled for RA transmission, the PRB for encoding the TAS payload.

14. The apparatus of claim 10, wherein the processing circuitry is further to:
encode, within the scheduling request, a temp ID for addressing the wUE.

15. The apparatus of claim 14, wherein the ACK payload is scrambled with the temp ID for addressing the wUE.

16. The apparatus of claim 10, wherein the processing circuitry is further to:
encode for transmission, user data together with the scheduling request.

17. The apparatus of claim 10, wherein the processing circuitry is further to switch a subframe from downlink to uplink.

18. A non-transitory machine-readable medium storing instructions for execution by processing circuitry of a network user equipment (nUE), the instructions causing the processing circuitry to:
schedule a RA (random access) resource in a PRB (physical resource block) in a control channel;
decode, in response to scheduling the RA resource, a RAS (receiver resource acknowledgement and sounding) payload received from a wUE (wearable user equipment) in the PRB in which the RA resource was scheduled; and
switch, in response to the RAS payload, a subframe from downlink to uplink to allow the wUE to transmit mission critical data.

19. The non-transitory machine-readable medium of claim 18, wherein the PRB in the control channel is generated from a RA-ID (RA identifier), and wherein control information is scrambled with the RA-ID.

20. The non-transitory machine-readable medium of claim 18, wherein the RAS payload carries a RA indication, and wherein the RAS payload is scrambled with a RA-ID (RA identifier).

* * * * *